United States Patent Office 3,788,849
Patented Jan. 29, 1974

3,788,849
NEGATIVE-WORKING PHOTOGRAPHIC PROCESS UTILIZING HEAT BLEACHABLE THIN LAYER OF A DYE
Seiichi Taguchi and Eiichi Mizuki, Saitama, Japan, assignors to Fuji Photo Film Co., Ltd., Kanagawa, Japan
No Drawing. Filed Nov. 26, 1971, Ser. No. 202,577
Claims priority, application Japan, Nov. 26, 1970, 45/104,264
Int. Cl. G03c 1/12, 5/24
U.S. Cl. 96—48 HD                              12 Claims

ABSTRACT OF THE DISCLOSURE

A process for forming an image comprising selectively exposing a portion of a light-sensitive material, which light-sensitive material comprises a support having thereon a thin layer of a dye which has an adsorption in the visible light region and which becomes stable to heat when it is exposed to light having a wavelength in the absorption region of the dye as compared to the unexposed state of the dye, to light of a wavelength in the absorption region of the dye and, simultaneously or immediately after exposure, heating the light-sensitive material to fade the dye at the unexposed areas.

BACKGROUND OF THE INVENTION

(1) Field of the invention

The present invention relates to a process of forming images and more particularly it is concerned with a process for forming visible images by exposing a thin film of a dye having an absorption in a visible wave length region to light which will be absorbed by the dye and heating the thin film simultaneously, or immediately after the exposure, whereby the dye at the areas which have not been exposed to the light is faded.

(2) Description of the prior art

In regard to the process of forming images in a non-silver salt photosensitive system, various systems have already been studied and developed and some have been successful. In J. Kosar "Light -Sensitive Systems" (Wiley Co.), a summary of the processes of forming images in non-silver salt light-sensitive systems is reported and there is described a method of using a diazo compound (see: ibid., pages 194–320) and a method of utilizing the photochemical formation and decomposition of a dye (see: ibid., pages 358–401). Among the compounds reported are a diazo compound, diphenylamine-carbon tetrabromide, a leuco dye, a photochromic material, etc., each of which has a sensitivity in the ultraviolet region and thus forms a dye image having an absorption at visible regions when exposed to ultraviolet rays.

Additionally, as image-forming processes of utilizing sensitivity in visible regions, there are known the following methods: utilization of a property of a photochromic material capable of being converted into the original colorless state from a colored state by the action of visible rays; and the utilization of a bleaching phenomenon of a dye by visible rays. In these known methods visible images are formed by the phenomenon that the areas exposed to light are faded.

BRIEF DESCRIPTION OF THE INVENTION

The inventors have succeeded in attaining the process of this invention based on the discovery that when a thin film of a dye is exposed to light and simultaneously or immediately after the exposure, heated, the areas of the dye film which have not been light exposed are readily bleached or faded as compared with the areas exposed to light. That is to say, the present invention provides an image forming process characterized in that a light-sensitive material having on a support a thin layer of a dye which has an absorption in the visible light region and which is more stabilized to heat after exposure to light in the visible light region is exposed to light having a wave length in the absorption region of the dye and, simultaneously or immediately after exposure, heated, whereby the dye at the areas which have not been exposed to light is faded.

BRIEF DESCRIPTION OF THE INVENTION

The dye used in this invention is characterized by having an absorption in a visible region and when being exposed to light having the wave length in its absorption region, the resistance of the dye to heat is increased and the colored dye becomes less faded as compared with the dye before exposure. The dyes having the properties mentioned above are usually found in the basic dyes. General classes of such dyes are the diphenylmethane dyes, triarylmethane dyes, xanthene dyes, acridine dyes, etc., and more particularly, examples of such dyes include Auramine, Rhodamine, Methylene Blue, Victoria Blue, Methyl Violet, Malachite Green, Brillant Green, Acridine Orange, and the like.

The layer of dye need only have a minimum thickness sufficient to permit a discernible image to be formed. Maximum thickness can vary greatly, but little is to be gained by excessive application as cost rises. Usually, a thickness of from about 0.1 to about $1\mu$ is preferred.

As the support on which the coating of the aforementioned dye is formed, there are such various materials as glass plates, plastic films, papers, and metallic plates, all of which may be properly selected according to the purpose of utilizing the images formed.

In order to form a film of the dye on the support, any typical method known in the art for forming uniform and thin films may be applied. For instance, the film of the dye may be formed on a support by dissolving the dye in a suitable solvent such as water or an organic solvent and coating the solution on the support. Also, when using a dye which is not decomposed but is evaporated or sublimed when it is heated in a vacuum, a vacuum evaporation film of the dye may be formed according to a well-known manner by means of a typical vacuum evaporation device.

The dye used in this invention is a material having light sensitivity and being capable of forming images. The sensitive region of the dye is in a visible region as mentioned before, that is to say, the dye has a sensitivity to the light of a wave length in the absorption region of the dye itself. Thus, the light source used for exposure when practicing the process of this invention may be properly selected according to the absorption characteristics of the dye. If the dye used is a yellow dye, blue light may be used as the light source although light containing a blue-light component, such as white light, may of course be used. When the light-sensitive layer is formed by using a mixture of a yellow dye and a magenta dye, the yellow dye is exposed to blue light and the magenta dye is exposed selectively to green light.

The sensitivity of the dye used in this invention is similar to that of ordinary diazo compounds, or about $10^{-3}$ to $10^{-4}$ by ASA sensitivity. Accordingly, the light-sensitive materials used in this invention may be produced or stored in the conditions of shielding intense light or without the necessity of a completely dark room.

The exposure intensity is easily determined for various embodiments by a simple pre-exposure. Usually, from about 4,000 to about 30,000 lux will be commercially used, with most units being at about 10,000 lux. The time of exposure can vary greatly, but again, usually exposure for about 30 seconds to about 4 minutes will be used with exposure of about 2 minutes or less being generally preferred. The balance of intensity and time will be apparent to one skilled in the art. It will be obvious in view of the above ranges that values outside the above ranges are easily used, and no overt criticality is to be attached to the selection of any one special intensity or time combination. Such variables are well understood by the art.

The subsequent and only treating step to which the light-sensitive material thus exposed is subjected is a heating step. Upon heating, the unexposed areas of the light-sensitive material are faded, whereas the exposed areas remain unchanged, whereby a dye image having a gradation opposite to that of the original is obtained.

The heating temperature is usually from about 40° C. to about 180° C. and is desirably selected in the temperature range at which the dye at the unexposed areas is faded but the dye at the exposed areas is not influenced. The desirable temperature is usually from about 120° C. to about 160° C. and the optimum temperature for each dye may be easily determined by a simple pre-experiment. A heating period of time may also be determined by a similar pre-experiment. For instance, prepare a thin layer of about $1\mu$ by coating a methanol solution of dye on the glass plate and drying. The thus obtained layer is heated above a hot plate, and temperature measuring by a thermometer. The point where the layer fades and becomes transparent is measured. This pre experimentation proceeds under conditions down to about 100 lux of light intensity. Excessive heating is undesirable since in such case the dye at the exposed areas or the dye forming color image will be faded. When paper is used as the support, care must be taken so that the paper is not carbonized.

It will be apparent that as long as there is some optical density difference between faded and unfaded areas an image can be detected. However, for general reading, it is preferred that the difference, or delta, be from about 0.3 to about 2.0, and dyes which meet this criterion are preferred. Lower differences may be difficult to read under adverse light conditions, while the upper limit is merely set because easily available dyes meet this criterion.

The merits or the features of this invention are as follows:

(1) The light-exposed areas remain finally as a color image. In other words, the process of this invention is a negative to positive process and provides continuous tone. Accordingly, a color positive is obtained from a color negative.

(2) The light-sensitive material used in this invention has sensitivity in a visible region and thus a specific lght source such as an ultraviolet lamp is unnecessary. Further, it is unnecessary that the support of the original used in the process of this invention have a high transmittance for ultraviolet rays.

(3) A visible image is obtained by heating. Accordingly, the process of this invention is a dry process and thus the image can be obtained easily and quickly.

(4) The light-sensitive layer of the light-sensitive material used in this invention is composed of a thin film of only a dye. Therefore, the light-sensitive layer is a non-binder system and the particle size of the dye is fine, which gives a sharp image. The light-sensitive material also has a high resolving power of higher than 600 lines/mm.

As a general rule, the finer the dye particle size, the sharper the image. This is, however, a change in degree and dyes of various sizes can be used, with a gradual decrease in sharpness as size increases. Usually, a dye particle size of about $0.2\mu$ or less is preferred for best results. The size will, of course, depend upon the requirements of the user.

By utilizing these merits the process of this invention may be applied for the reproduction of color images, as various kinds of masks when making prints or color prints, for the reproduction of micronegatives, and for making general copies.

The invention will be explained more concretely by showing the following examples.

EXAMPLE 1

40 mg. of Rhodamine B was placed in an evaporation vessel made of molybdenum and after adding dropwise a small amount of methanol to the dye to dissolve the dye, the solution of the dye was allowed to stand for 10 minutes. This treatment assisted in making the dye adhere closely to the inside wall of the evaporation vessel and to prevent the occurrence of undesirable phenomena such as bumping. A glass plate of 12 cm.$^2$ in area and 1.5 mm. in thickness was set above the evaporation vessel with a distance of 18 cm. as a support for the dye. After evacuating the evaporation vessel to a pressure of from $4\times10^{-4}$ to $2\times10^{-4}$ torr by means of a vacuum pump, an electric current was passed gradually through a heater in the evaporation vessel from 0 ampere to 20 amperes and when a large part of the dye was evaporated, the current was cut. It took about three minutes to accomplish the vacuum evaporation of the dye.

The light-sensitive material having the vacuum evaporated layer of Rhodamine B on the glass plate thus prepared was subjected to a contact exposure using a negative line image as the original. A 500 watt tungsten lamp was used as the light source and the distance of the light-sensitive material from the light source was 20 cm. The illumination at the exposure surface of the light-sensitive material was 20,000 lux and the exposure was conducted from one minute, two minutes, four minutes and eight minutes.

Thereafter, the light-sensitive material thus exposed was disposed over a 600 watt electric heater with a distance of about 100 cm. therefrom with the evaporated layer facing the heater and maintained at the position for one minute. For conducting the heating uniformly, the sample was moved properly. The temperature on the surface of the support was about 140° C. By the heating treatment the unexposed areas of the sample were faded to give a positive image of the original.

When the exposure time was one minute, the difference in optical density between the exposure areas and the unexposed areas was 0.3. Also, the differences when the exposure times were 2 minutes, 4 minutes and 8 minutes were 1.5, 2.6 and 2.4 respectively. The density measurement was conducted by using green light obtained by masking a tungsten lamp with a green filter having the maximum transmittance at 536 m$\mu$.

EXAMPLE 2

A light-sensitive material was produced by the same way as in Example 1 using Rhodamine as a dye and a polyethylene terephthalate film as a support. The light-sensitive material was exposed to green light of 550 m$\mu$ in ($\lambda_{max}$) through a color negative. The exposure was conducted for 10 minutes by means of a 500 watt tungsten lamp with a distance of 20 cm. By heating the sample as in Example 1, a magenta colored positive image of Rhodamine was obtained from the color negative original.

EXAMPLE 3

A light-sensitive material was produced by the same method as in Example 1 using Auramine as the dye and a paper for Xerox copying as the support. The light-sensitive material was exposed for 8 minutes as in Example 1. The sample was heated by maintaining it over a 600 watt electric heater for about 90 minutes with a distance of about 10 cm. and with the evaporated layer facing the heater. By the heat treatment the non-image portions, or the unexposed areas, were faded to give a positive image of the original. The difference in optical density between the image portions and the non-image portions was 1.6. The density measurement was conducted by blue light obtained by masking a tungsten lamp with a blue filter having the maximum transmittance at 420 m$\mu$.

EXAMPLE 4

10 mg. of Crystal Violet was dissolved in 3 ml. of methanol and the solution was applied to a glass plate of 12 cm. x 16.5 cm. having an undercoating of gelatin of 0.1$\mu$ in thickness. The layer was dried while maintaining the glass plate horizontally to provide a light-sensitive material. By applying a similar treatment to that of Example 1 using the light-sensitive material thus obtained, a visible image was obtained.

EXAMPLE 5

A light-sensitive material was produced by the same method as in Example 1 except that a triacetyl cellulose film having a thickness of 200 m$\mu$ was used in place of the glass plate in the same example. When the spectral sensitivity of the light-sensitive material was measured by means of a spectrophotograph, it was confirmed that it had the maximum sensitivity at 550 nm. and had been exposed in the region of from 500 nm. to 610 nm.

Also, one of the light-sensitive materials was treated as in Example 1, while others were exposed to the light as used in the same example through glass filters UV–31, V–Y50, and V–R64 (made by Tokyo Shibaura Electric Co.) respectively, and then treated as in Example 1. The glass filters UV–31, V–Y50, and V–R64 such properties that they did not pass the light having wave lengths shorter than 310 nm., 500 nm. and 640 nm. respectively but passed the light having wave lengths longer than these values respectively. Upon comparing the four sample films, the samples exposed by using the filters UV–31 and V–Y50 respectively gave the same results as that of the sample exposed without using a filter. On the other hand, the sample exposed by using the filter V–R64 gave no images. This showed that the light-sensitive material produced in this example was sensitive to the light having wave lengths of from 500 nm. to 640 nm.

While the above is illustrative of a preferred embodiment it should be clear that skilled workers in the art can readily modify the present invention, and accordingly, the scope of the present invention should not be construed as being limited in any manner.

What is claimed is:

1. A process for forming an image comprising
   selectively exposing a light-sensitive material, which light-sensitive material comprises
      a support having thereon a thin layer consisting essentially of a dye selected from the group consisting of diphenylmethane dye, a triarylmethane dye, an xanthene dye and an acridine dye, said dye having an ASA sensitivity of from about $10^{-3}$ to about $10^{-4}$, having an absorption in the visible light region and becoming stable to heat when it is exposed to light having a wavelength in the absorption region of the dye as compared to the unexposed state of the dye, said layer being free of a binder,
   to light of a wavelength in the absorption region of the dye, and
   simultaneously or substantially immediately after exposure, heating the light-sensitive material at a temperature of from about 40° C. to about 180° C. to fade the dye at the unexposed areas, whereby the dye at the exposed areas is not faded and the difference in the optical density between the dye at the faded areas and the unfaded dye is at least about 0.3.

2. The process of claim 1, wherein said dye is selected from the group consisting of Auramine, Rhodamine, Methylene Blue, Victoria Blue, Methyl Violet, Malachite Green, Brillant Green, and Acridine Orange.

3. The process of claim 1, wherein the layer is about 0.1 to about 1.0$\mu$ thick.

4. The process of claim 1, wherein the exposure is with light of an intensity of at least about 4,000 lux.

5. The process of claim 1, wherein the exposure is for about at least 30 seconds.

6. The process of claim 5, wherein the exposure intensity is less than about 30,000 lux.

7. The process of claim 6, wherein the exposure is for from about 30 seconds to about 4 minutes.

8. The process of claim 1, wherein the heating is at from about 120° C. to about 160° C.

9. The process of claim 1, wherein the difference is up to about 2.0.

10. The process according to claim 1, wherein said support is selected from the group consisting of a glass plate, plastic film, paper and metallic plate.

11. The process of claim 1, wherein said exposed areas remain finally as color images.

12. The process of claim 1, wherein said dye has a particle size of about 0.2$\mu$ or less.

References Cited
UNITED STATES PATENTS

| | | | |
|---|---|---|---|
| 1,013,458 | 1/1912 | Smith | 96—89 R |
| 1,916,350 | 7/1933 | Wendt, et al. | 96—89 R |
| 3,690,889 | 9/1972 | Harrison, et al. | 96—90 R |
| 3,305,361 | 2/1967 | Gayor, et al. | 96—48 HD |

J. TRAVIS BROWN, Primary Examiner

W. H. LOUIE, JR., Assistant Examiner

U.S. Cl. X.R.

96—89, 67